(12) United States Patent
Medalsy

(10) Patent No.: US 11,712,839 B2
(45) Date of Patent: *Aug. 1, 2023

(54) METHOD AND SYSTEM FOR MEASURING A PRESSURE DISTRIBUTION BETWEEN A SURFACE OF AN OBJECT AND A PRESSURE-SENSITIVE SURFACE DURING FORMATION OF THE OBJECT

(71) Applicant: NEXA3D Inc., Ventura, CA (US)

(72) Inventor: Izhar Medalsy, Ventura, CA (US)

(73) Assignee: NEXA3D Inc., Ventura, CA (US)

( * ) Notice: Subject to any disclaimer, the term of this patent is extended or adjusted under 35 U.S.C. 154(b) by 212 days.

This patent is subject to a terminal disclaimer.

(21) Appl. No.: 17/301,964

(22) Filed: Apr. 20, 2021

(65) Prior Publication Data
US 2021/0237346 A1 Aug. 5, 2021

Related U.S. Application Data

(63) Continuation of application No. 16/254,433, filed on Jan. 22, 2019, now Pat. No. 11,007,708.
(Continued)

(51) Int. Cl.
*B29C 64/286* (2017.01)
*B29C 64/124* (2017.01)
(Continued)

(52) U.S. Cl.
CPC .......... *B29C 64/124* (2017.08); *B29C 64/255* (2017.08); *B29C 64/393* (2017.08);
(Continued)

(58) Field of Classification Search
CPC ... B29C 64/124; B29C 64/393; B29C 64/255; B29C 64/286; B33Y 50/02; B33Y 30/00; B33Y 10/00
(Continued)

(56) References Cited

U.S. PATENT DOCUMENTS 10,222,279 B1 3/2019 Legrand, III et al.
2009/0186306 A1* 7/2009 Haraldsson ........... B29C 64/135
430/322

(Continued)

OTHER PUBLICATIONS

International Search Report and Written Opinion dated Apr. 24, 2019, from the ISA/European Patent Office, for International Patent Application No. PCT/US2019/014621 (filed Jan. 22, 2019), 14 pages.
(Continued)

*Primary Examiner* — Emilio J Saavedra
(74) *Attorney, Agent, or Firm* — Ascenda Law Group, PC

(57) ABSTRACT

Described are methods and apparatus for the inspection of cured layers of an object during the fabrication of the object using a 3D printing system. A just-printed layer may be inspected by pressing the layer against a pressure-sensitive surface in order to collect information about the layer. For example, a tank may contain a photo-curing liquid polymer, and at its bottom are pressure sensitive elements (e.g., in a backing member or mask). An extraction plate to which the object is affixed may be adjusted so as to position a surface of the object adjacent to the pressure sensitive elements, which report a pressure distribution (e.g., by virtue of a force exerted by a localized region of the object on a localized region of the pressure sensitive elements).

7 Claims, 19 Drawing Sheets

Related U.S. Application Data

(60) Provisional application No. 62/637,045, filed on Mar. 1, 2018.

(51) Int. Cl.
*B33Y 50/02* (2015.01)
*B29C 64/393* (2017.01)
*B29C 64/255* (2017.01)
*B33Y 30/00* (2015.01)
*B33Y 10/00* (2015.01)

(52) U.S. Cl.
CPC ............ *B33Y 50/02* (2014.12); *B29C 64/286* (2017.08); *B33Y 10/00* (2014.12); *B33Y 30/00* (2014.12)

(58) Field of Classification Search
USPC ........................................................ 700/119
See application file for complete search history.

(56) References Cited

U.S. PATENT DOCUMENTS

| | | |
|---|---|---|
| 2015/0064298 A1 | 3/2015 | Syao |
| 2015/0246487 A1* | 9/2015 | El-Siblani ............ B29C 64/393 425/150 |
| 2016/0067922 A1 | 3/2016 | Voris et al. |
| 2017/0129175 A1 | 5/2017 | Zitelli et al. |
| 2018/0071976 A1* | 3/2018 | Tumbleston ........... B33Y 10/00 |
| 2018/0071977 A1 | 3/2018 | Tumbleston et al. |
| 2018/0265997 A1 | 9/2018 | Mora |
| 2021/0237346 A1* | 8/2021 | Medalsy ................ B33Y 50/02 |
| 2021/0294210 A1* | 9/2021 | Elsey .................... B33Y 30/00 |

OTHER PUBLICATIONS

International Preliminary Report on Patentability dated May 4, 2021, from the IPEA/US, for International Patent Application No. PCT/US2019/014621, 24 pgs.

* cited by examiner

METHOD AND SYSTEM FOR MEASURING A PRESSURE DISTRIBUTION BETWEEN A SURFACE OF AN OBJECT AND A PRESSURE-SENSITIVE SURFACE DURING FORMATION OF THE OBJECT

RELATED APPLICATIONS

This application is a continuation of patent application Ser. No. 16/254,433, filed on 22 Jan. 2019 (now issued as U.S. Pat. No. 11,007,708), which claims priority to U.S. Provisional Application No. 62/637,045, filed on 1 Mar. 2018, both of which are incorporated by reference herein.

FIELD OF THE INVENTION

The present invention relates to the inspection of a cured layer of a 3D object during the fabrication of the 3D object (e.g., printing of the 3D object using a 3D printing system), and more specifically relates to pressing the cured layer against a pressure-sensitive surface in order to collect information about the cured layer.

BACKGROUND 3D (i.e., three-dimensional) printing is becoming ever more widespread, allowing three-dimensional objects to be fabricated (often in a short amount of time) in any facility (i.e., room, garage, laboratory, etc.). Typically, cross-sections of a three-dimensional object are modelled and saved into a digital format, and the three-dimensional object is fabricated layer by layer using the cross-sectional models.

SUMMARY OF THE INVENTION

Techniques are discussed for inspecting one or more cured layers during the formation of a 3D object. The inspection may include gently pressing a cured layer against pressure sensitive elements (or more generally, imparting a force on the cured layer in the direction towards the pressure sensitive elements) in order to generate a pressure distribution. In one embodiment of the invention, the cured layer may directly contact the pressure sensitive elements, while in another embodiment of the invention, the cured layer may be separated from the pressure sensitive elements by a flexible membrane (and hence may not be in direct contact with the pressure sensitive elements).

In one embodiment of the invention, the pressure sensitive elements may be located on a surface of (or within) a radiation-transparent backing member, such as borosilicate glass. In another embodiment of the invention, the pressure sensitive elements may be located on a surface of (or within) a mask, such as a liquid crystal layer.

The pressure distribution measured by the pressure sensitive elements may be compared to a reference pressure distribution in order to determine whether the cured layer has been fabricated according to design specifications (e.g., whether a structure has the desired width, whether two structures have the same height as desired, etc.). If the measured pressure distribution matches the reference pressure distribution (or matches to a sufficient degree), the cured layer may be determined to be formed free of defects, and the fabrication process may continue. If the measured pressure distribution deviates from the reference pressure distribution (or deviates to a sufficient degree), one or more remediation measures may be performed, or the fabrication process may be aborted.

These and other embodiments of the invention are more fully described in association with the drawings below.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. Description associated with any one of the figures may be applied to a different figure containing like or similar components/steps. While the flow diagrams each present a series of steps in a certain order, the order of the steps may be changed.

Figure 1A:
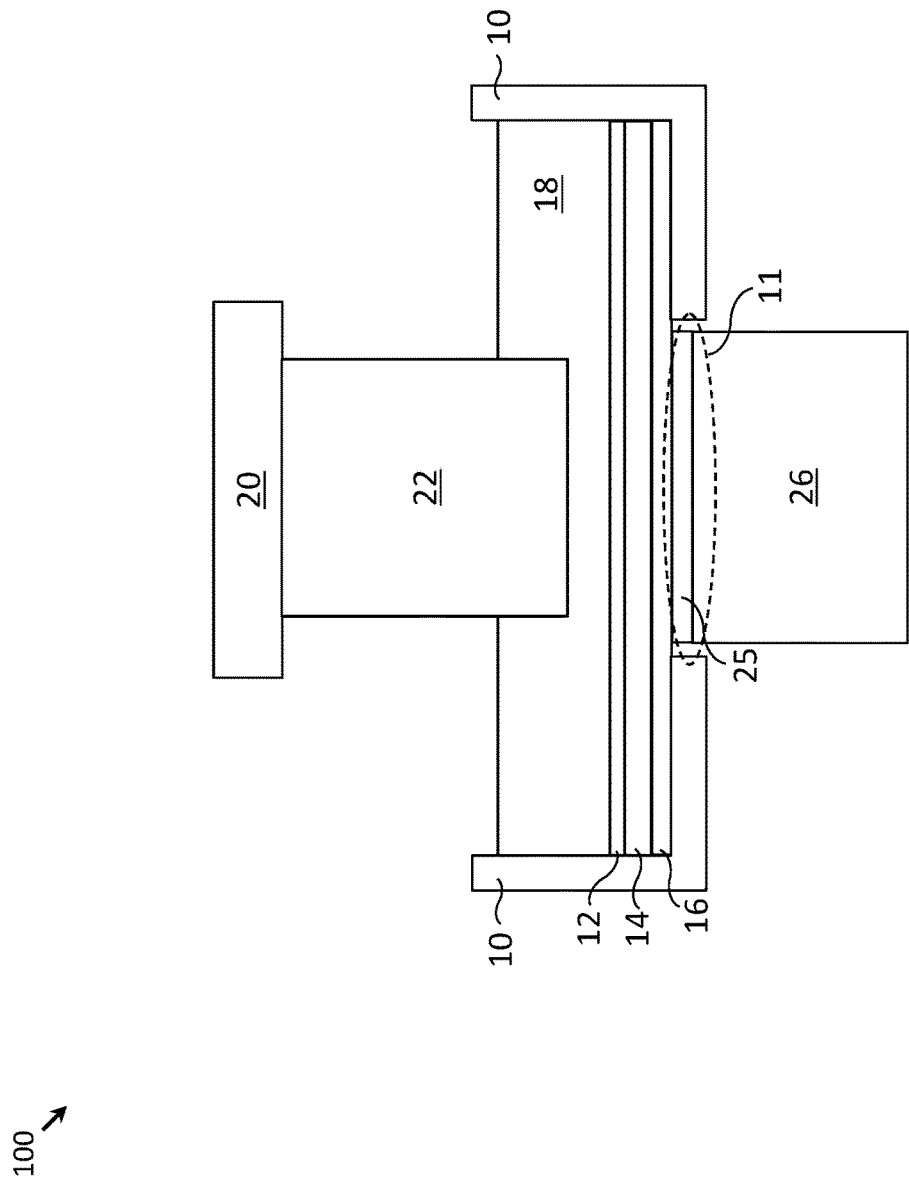
FIG. 1A depicts a cross-section of a 3D printing system, in which a radiation-transparent backing member is used to seal an opening of a tank containing photo-curing liquid polymer, in accordance with one embodiment of the invention.

FIG. 1A depicts a cross-section of 3D printing system 100, in which electromagnetic radiation (e.g., ultra-violet light) is used to cure photo-curing liquid polymer 18 in order to fabricate object 22 (e.g., a 3D object). Object 22 may be fabricated layer by layer (i.e., a new layer of object may be formed by photo-curing a layer of liquid polymer 18 adjacent to the bottom surface of object; the object may be raised by extractor plate 20, allowing a new layer of photo-curing liquid polymer 18 to be drawn under the newly formed layer; and the process may be repeated to form additional layers).

The 3D printing system 100 may include tank 10 for containing the photo-curing liquid polymer 18. The bottom of tank 10 may include tank opening 11 to allow electromagnetic radiation from light source 26 to enter into tank 10. A radiation-transparent backing member 16 may be used to seal the tank opening 11 (i.e., to prevent the photo-curing liquid polymer 18 from leaking out of tank 10), while at the same time, allowing electromagnetic radiation to enter into tank 10 in order to cure the liquid polymer. In one embodiment, backing member 16 may be made from borosilicate glass. A mask 25 (e.g., a liquid crystal layer) may be disposed between light source 26 and the photo-curing liquid polymer 18 to allow the selective curing of the liquid polymer (which allows the formation of 3D object with intricate shapes/patterns). In various embodiments, collimation and diffusion elements such as lenses, reflectors, filters, and/or films may be positioned between mask 25 and light source 26. These elements are not shown in the illustrations so as not to unnecessarily obscure the drawings.

One challenge faced by 3D printing systems is that in addition to adhering to the object, the newly formed layer has a tendency for adhering to the bottom of tank, which is not desired, as the newly formed layer could tear off from the object when the object is raised. To address this issue, a flexible membrane 14 (also called a self-lubricating membrane) may be disposed adjacent to backing member 16. In some embodiments, flexible membrane 14 may be formed using a self-lubricating polymer that gradually releases a layer of liquid lubricant 12 onto the surface of flexible membrane 14 over time. The lubricant layer 12 may reduce the likelihood for the newly formed layer to adhere to the bottom of tank 10. The flexible membrane may be formed using silicone and the liquid lubricant may include silicone oil. Either or both of the liquid lubricant and the flexible membrane may be enriched with polytetrafluoroethylene (PTFE) to further increase the "non-stick" quality of flexible membrane 14 and/or lubricant layer 12. Both the flexible membrane 14 and the liquid lubricant 12 are also radiation-transparent so as to allow electromagnetic radiation from light source 26 to enter into tank 10 in order to cure the liquid polymer. The use of such a flexible membrane 14 with a self-lubricating polymer is optional and, in other embodiments, the membrane may be formed of a different material or even omitted altogether (e.g. where the surface of the backing member 16 is itself a flexible membrane or flexible surface).

Figure 1B:
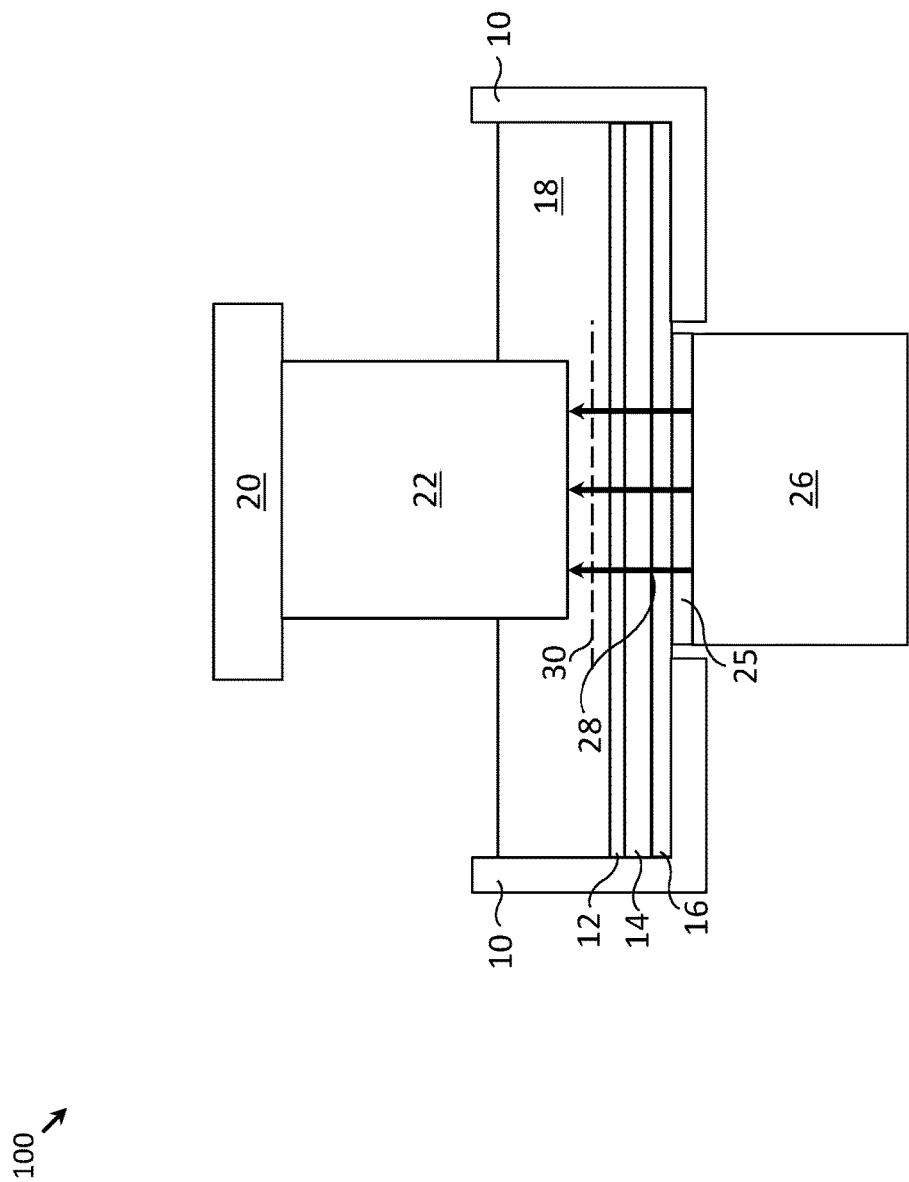
FIG. 1B depicts the 3D printing system of FIG. 1A, in which electromagnetic radiation is emitted from a light source into the tank containing photo-curing liquid polymer, in accordance with one embodiment of the invention.

FIGS. 1B-1E illustrate steps that may be sequentially performed in the fabrication of one layer of object 22 using 3D printing system 100. As shown in FIG. 1B, electromagnetic radiation 28 is emitted from light source 26 through tank opening 11 into tank 10. The electromagnetic radiation may form an image on image plane 30. Areas of high (or moderate) intensity within the image may cure localized regions of the photo-curing liquid polymer 18.

Figure 1C:
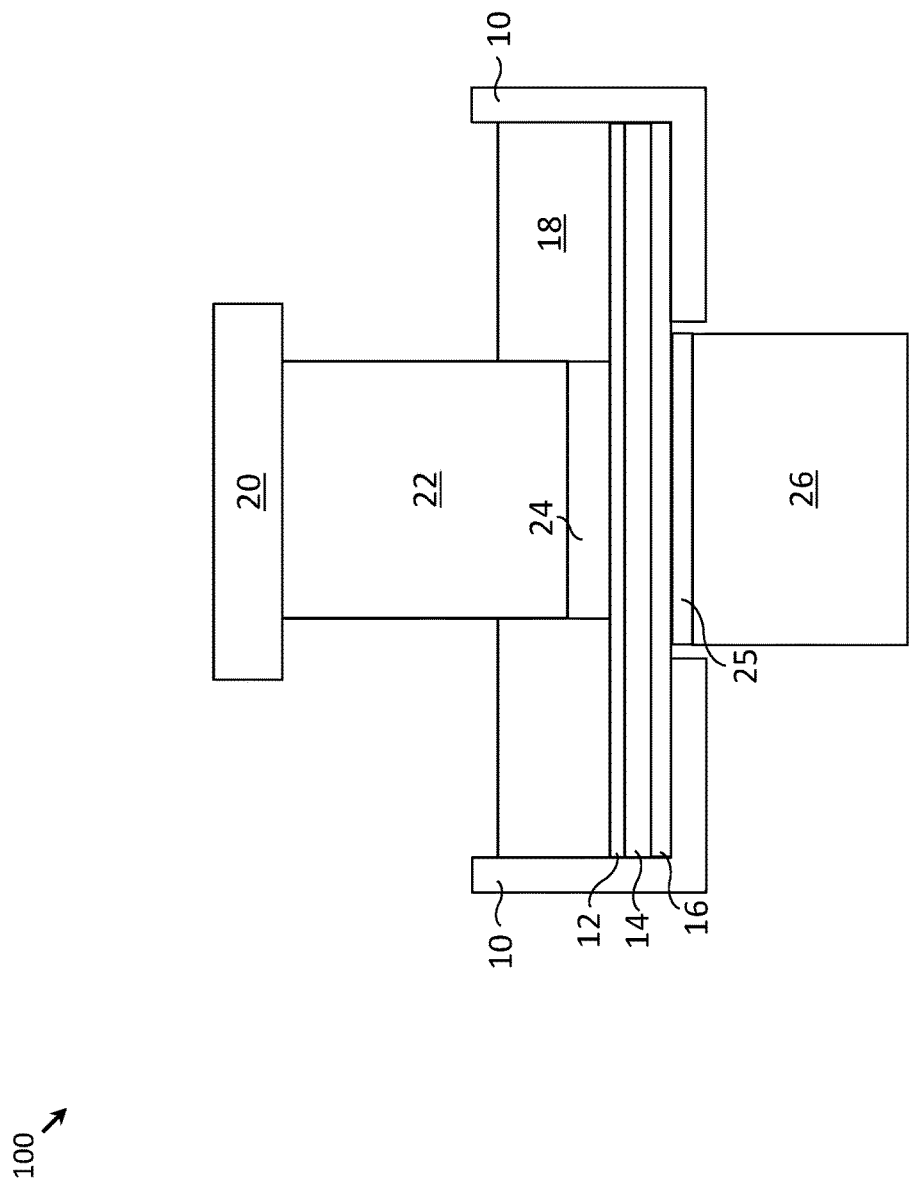
FIG. 1C depicts the 3D printing system of FIG. 1A, in which a layer of photo-cured liquid polymer has been formed on a surface of a 3D object, in accordance with one embodiment of the invention.

Next, as shown in FIG. 1C, cured layer 24 (which is a newly formed layer of object 22) has formed due to the curing of the photo-curing liquid polymer 18. Cured layer 24 adheres to the former bottom surface of object 22, and substantially does not adhere to the bottom surface of tank 10, due to the presence of lubricant layer 12. After cured layer 24 has been formed, the emission of electromagnetic radiation 28 may temporarily be suspended (as reflected by the absence of arrows 28 in FIG. 1C).

Figure 1D:
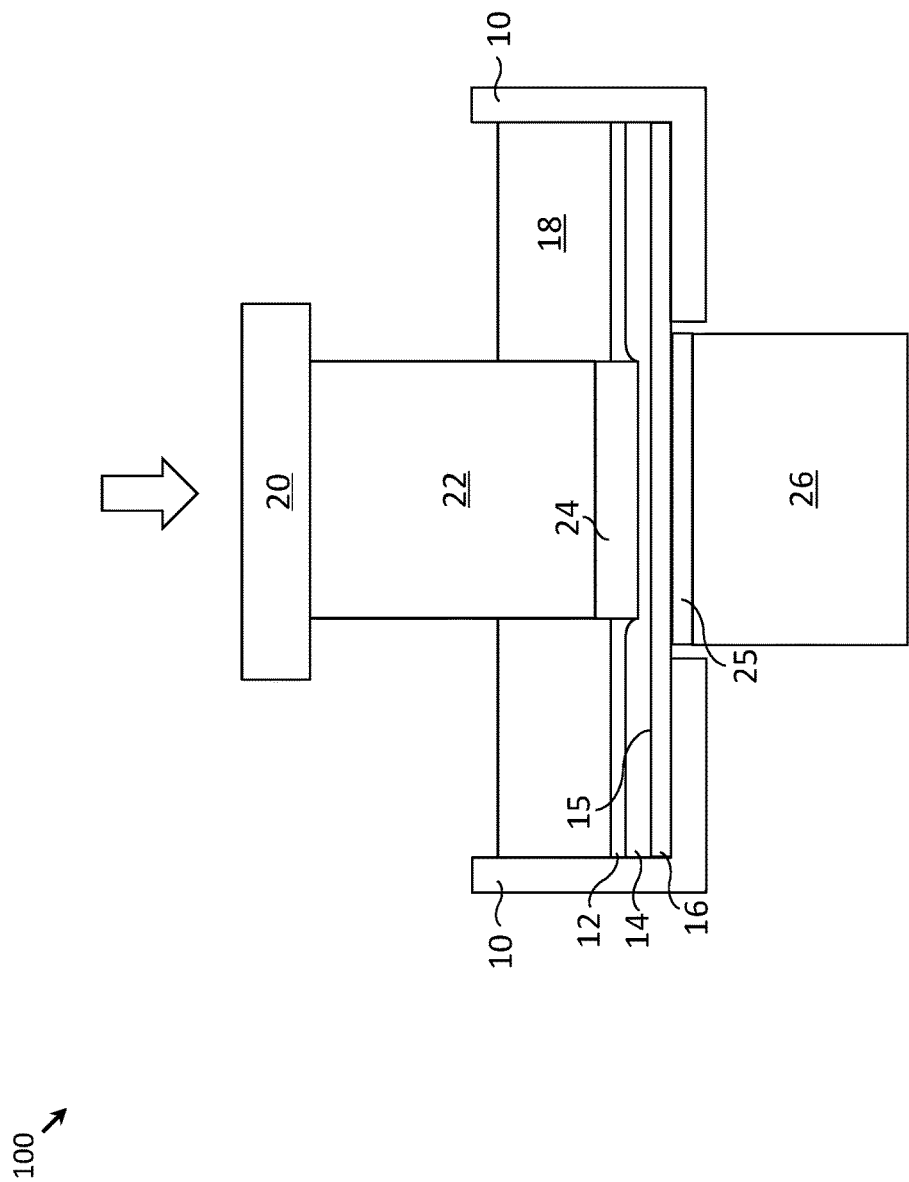
FIG. 1D depicts the 3D printing system of FIG. 1A, in which the 3D object is pressed towards a pressure-sensitive surface of a radiation-transparent backing member, in accordance with one embodiment of the invention.

Next, as shown in FIG. 1D, an inspection step may be performed to assess the quality of the newly formed layer 24. More specifically, information regarding the bottom surface of the newly formed layer 24 may be obtained by measuring the pressure distribution that is present when the bottom surface of the newly formed layer 24 is positioned adjacent to backing member 16. Even more specifically, a height adjustor (shown in FIG. 5) may gently press object 22 (including newly formed layer 24) into flexible membrane 14 (which may deform as shown in FIG. 1D), and the force from object 22 may propagate through flexible member onto backing member 16.

Backing member 16 may comprise pressure-sensitive surface 15, allowing backing member 16 to measure a pressure distribution over its pressure-sensitive surface. Although shown in the illustration as being on top of backing member 16, in practice pressure-sensitive surface 15 may be implemented as sensing elements (e.g., resistive array elements) located within or even behind backing member 16. In such instances, the pressure-sensitive surface 15 and backing member 16 may be an integrated resistive screen in which the force of the newly formed layer 24 pressing against a top surface of backing member 16 displaces that surface from a planar orientation so as to cause electrical conductors comprising the pressure sensitive elements within the backing member to touch one another, causing a change in electrical current flow. A scratch resistant layer may be disposed as a top surface of the backing member so as to provide durability. Note that the term "pressure sensitive" is not meant to exclude capacitive sensors that respond to changes in the flow of electrical current rather than an exerted force as is the case with resistive array elements. In other embodiments, the pressure-sensitive surface 15 may be implemented as an array of electrodes distributed about the perimeter of the backing member 16. Further, in some embodiments, backing member 16 and pressure sensitive layer 15 may be implemented as a frustrated total internal reflection (FTIR) screen, which uses scattered light and an array of optical sensors to detect contacts to its surface. For ease of discussion, this description will refer to backing member 16 and pressure-sensitive surface 15 as if they were separate elements, but it should be recognized that in most instances they will be an integrated unit of one of the kinds described above. The pressure distribution may include a two-dimensional array of pressure measurements, each of the pressure measurements indicating a localized pressure generated by a force exerted from a localized region of the object on a localized region of the pressure-sensitive surface. In essence, the pressure distribution may resemble a "stamp" of the bottom of object 22 (e.g., as if the bottom of object 22 were pressed onto an ink pad and then onto a piece of paper to generate a stamp).

The measured pressure distribution may be compared to a reference pressure distribution (i.e., a pressure distribution that is expected for a layer of photo-cured liquid polymer that is properly formed at a particular point in the 3D printing process). The reference pressure distribution may be generated either by simulation or by measurement of an object with a cured layer that has been verified via other methods (e.g., visually inspected by a person, etc.).

If the measured pressure distribution matches the reference pressure distribution (or matches to a sufficient degree), the newly formed cured layer may be determined to be formed free of defects. If the measured pressure distribution deviates from the reference pressure distribution (or deviates to a sufficient degree), one or more remediation measures may be performed. For instance, a feature that is formed of insufficient height or width on the bottom surface of object 22 may be enlarged by a subsequent photo-curing step. If remediation measures are not possible (e.g., if the width of a feature is too wide), object 22 may be discarded.

While the inspection step has been described for a 3D printing system with flexible membrane 14, such an inspection step could similarly be performed for a 3D printing system without flexible membrane 14 in which the bottom surface of object 22 could be pressed directly onto the upper surface of backing member 16.

Figure 1E:
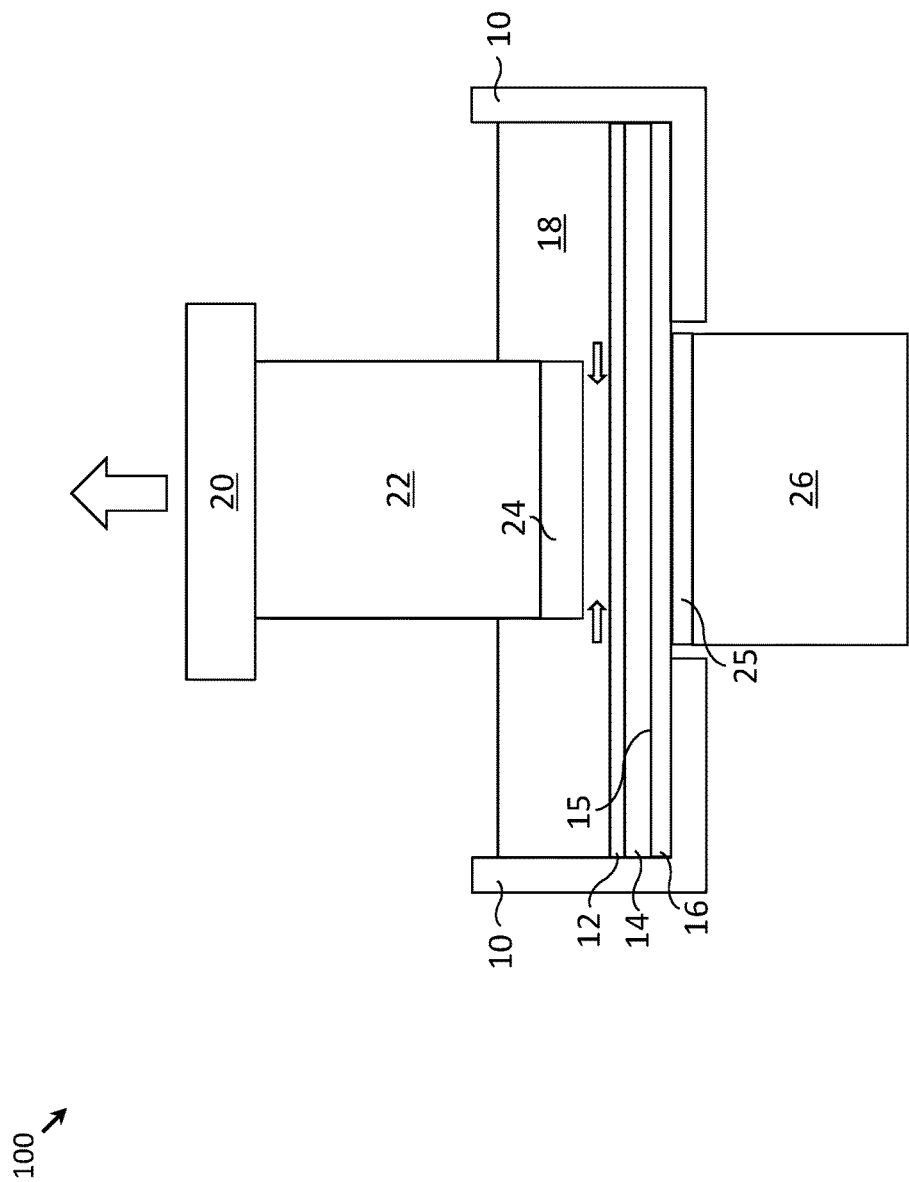
FIG. 1E depicts the 3D printing system of FIG. 1A, in which the 3D object is separated from the pressure-sensitive surface of the radiation-transparent backing member, in preparation for the formation of a subsequent layer of photo-cured liquid polymer, in accordance with one embodiment of the invention.

Once the newly formed layer 24 has passed the inspection step, object 22 may be positioned away, as shown in FIG. 1E, from the backing member 16 (e.g., incrementally raised within tank 10) in preparation for a subsequent layer of photo-cured liquid polymer to be formed on the object. While raising object 22 within tank 10, photo-curing liquid polymer 18 may be drawn into the void generated by the raising of object 22, and such photo-curing liquid polymer 18 will allow for the formation of the next layer of object 22.

FIGS. 2A-2E describe similar processing steps as FIGS. 1A-1E, except for a variant of a 3D printing system 200 without backing member 16. In the embodiment of FIGS. 2A-2E, rather than using backing member 16 to seal tank opening 11, mask 25 is placed within tank opening 11 in order to seal tank opening 11. To create a better seal of tank opening 11, seal 27 (e.g., rubber gasket, caulking, etc.) may be disposed between mask 25 and tank 10. Flexible membrane 14 may be disposed directly over the bottom of tank 10 and the top surface of mask 25. Further, rather than the pressure-sensitive surface being located on backing member 16, pressure-sensitive surface 32 may be located on or within (incorporated in) mask 25 or the light emitting element. That is, although shown in the illustration as being on top of mask 25, in practice pressure-sensitive surface 32 may be implemented as sensing elements (e.g., resistive array elements) located within or even behind mask 25. In such instances, the pressure-sensitive surface 32 and mask 25 may be an integrated resistive screen in which the force of the newly formed layer 24 pressing against a top surface of mask 25 displaces that surface from a planar orientation so as to cause electrical conductors comprising the pressure sensitive elements within the backing member to touch one another, causing a change in electrical current flow. A scratch resistant layer may be disposed as a top surface of the backing member so as to provide durability. Note that the term "pressure sensitive" is not meant to exclude capacitive sensors that respond to changes in the flow of electrical current rather than an exerted force as is the case with resistive array elements. In other embodiments, the pressure-sensitive surface 32 may be implemented as an array of electrodes distributed about the perimeter of the mask 25. Further, in some embodiments, mask 25 and pressure sensitive layer 32 may be implemented as a frustrated total internal reflection (FTIR) screen, which uses scattered light and an array of optical sensors to detect contacts to its surface. For ease of discussion, this description will refer to mask 25 and pressure-sensitive surface 32 as if they were separate elements, but it should be recognized that in most instances they will be an integrated unit of one of the kinds described above. The omission of backing member 16 has certain benefits, including lower cost, fewer components to maintain and service, etc. Additionally, light source 26 may be disposed closer to image plane 30.

Figure 2A:
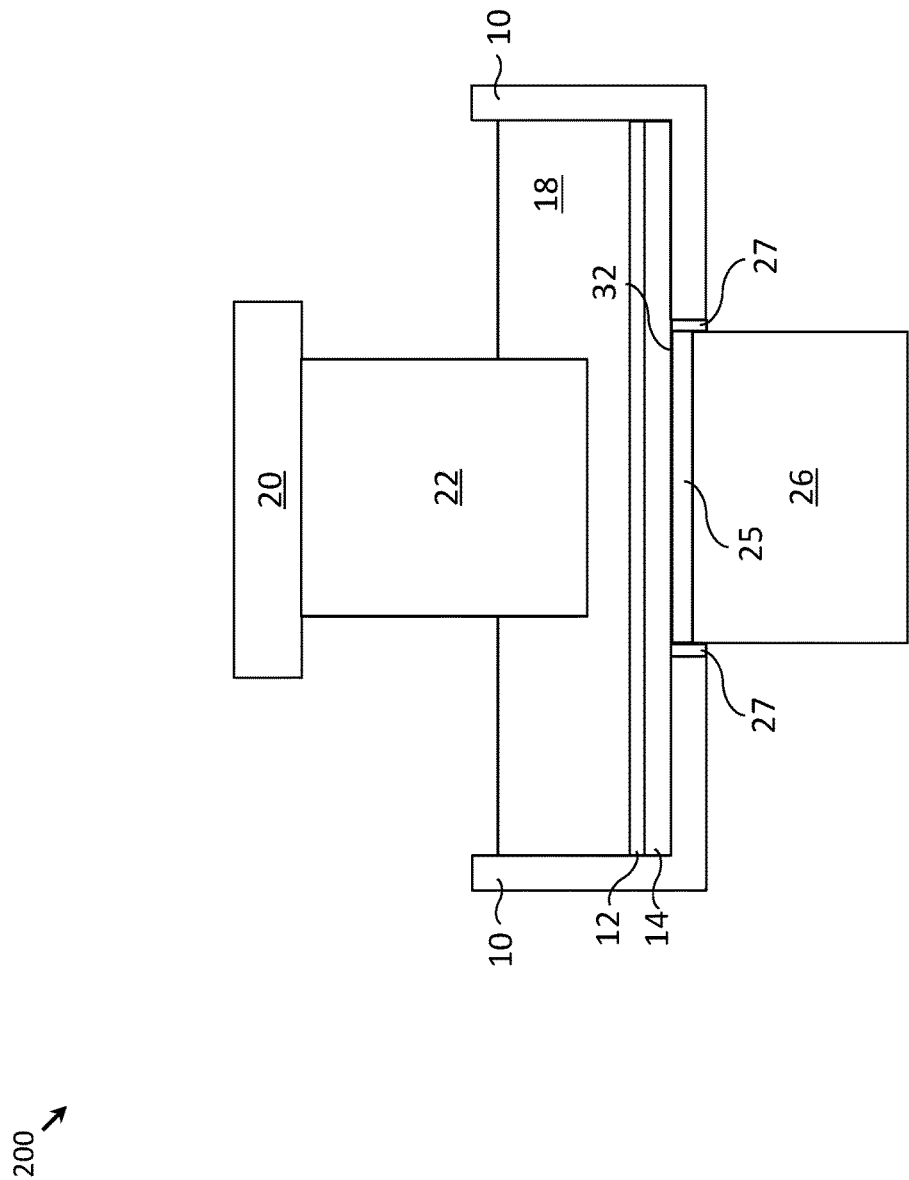
FIG. 2A depicts a cross-section of a 3D printing system, in which a mask is disposed within an opening of a tank containing photo-curing liquid polymer, in accordance with one embodiment of the invention.
Figure 2B:
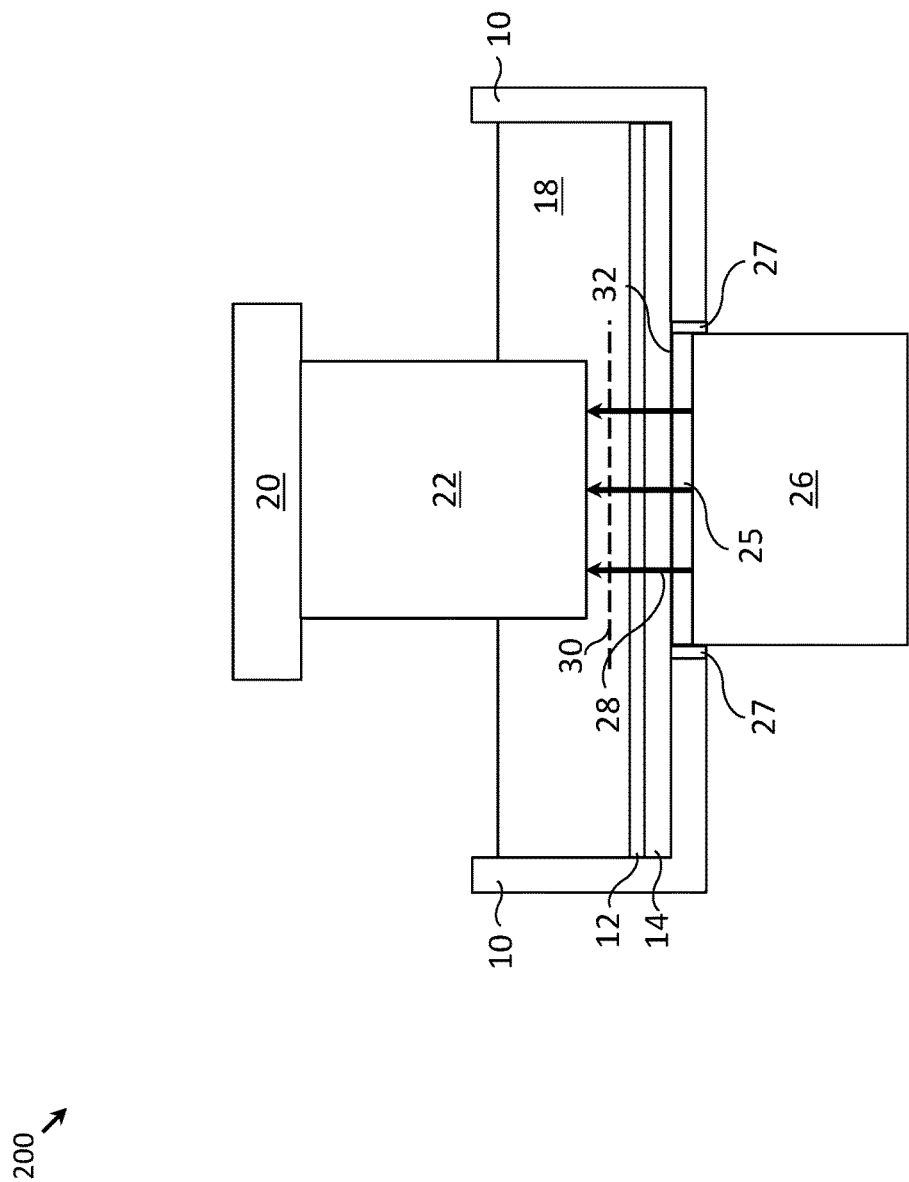
FIG. 2B depicts the 3D printing system of FIG. 2A, in which electromagnetic radiation is emitted from a light source into the tank containing photo-curing liquid polymer, in accordance with one embodiment of the invention.
Figure 2C:
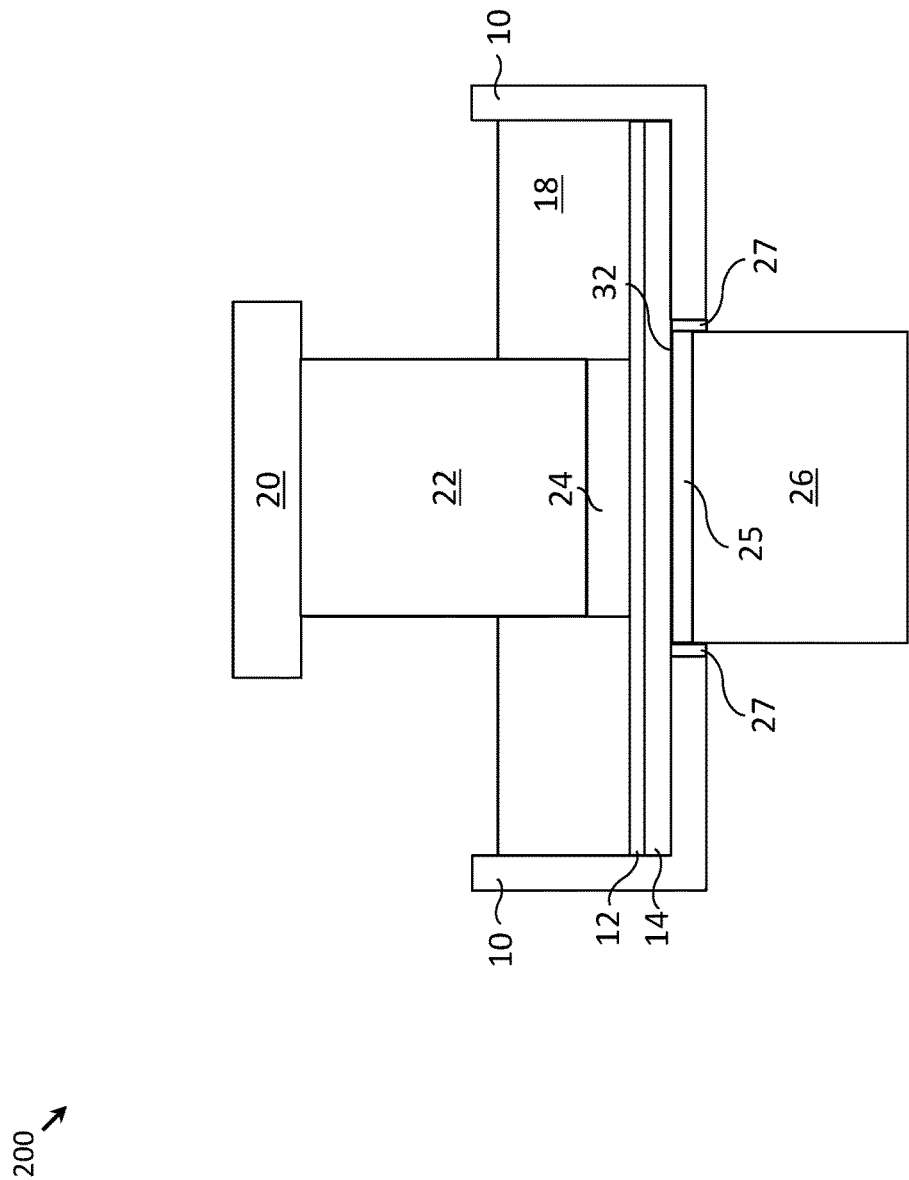
FIG. 2C depicts the 3D printing system of FIG. 2A, in which a layer of photo-cured liquid polymer has been formed on a surface of a 3D object, in accordance with one embodiment of the invention.
Figure 2D:
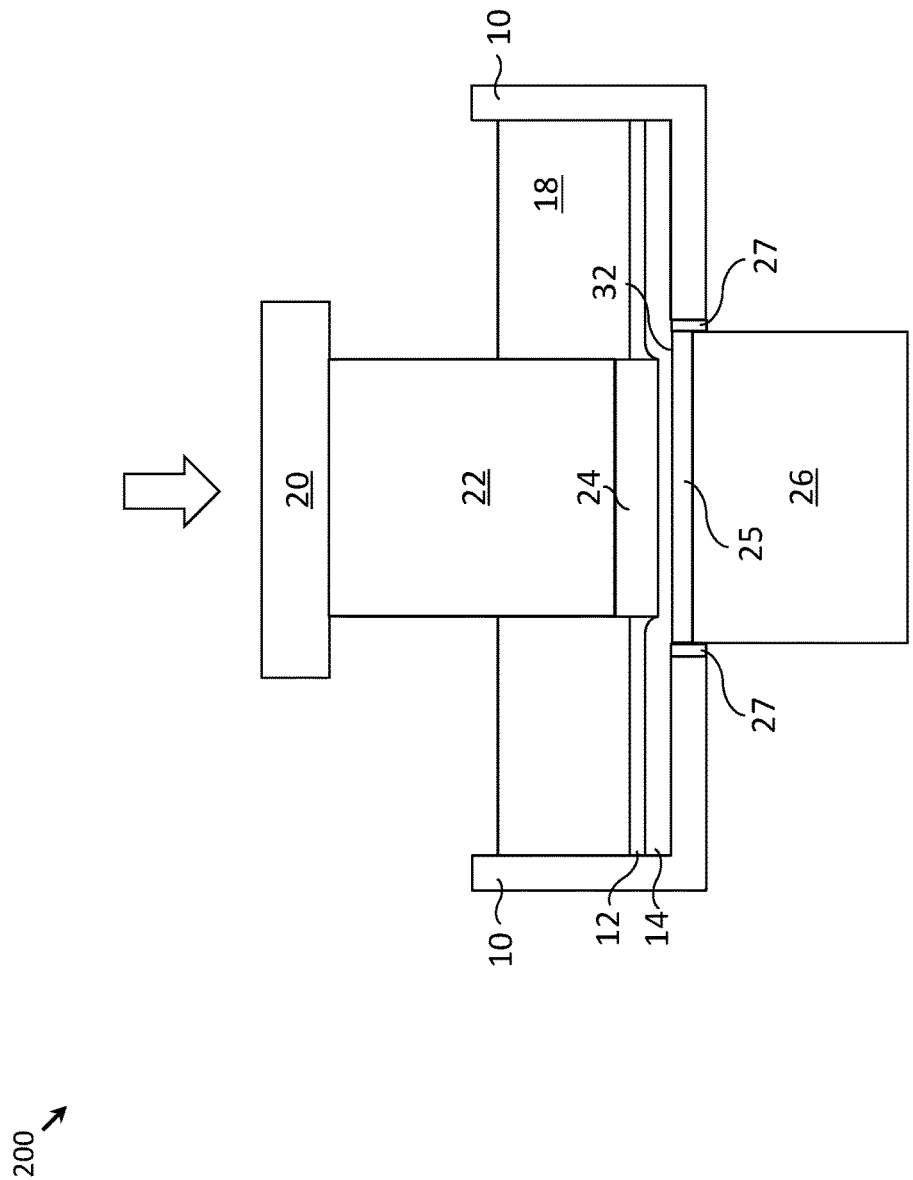
FIG. 2D depicts the 3D printing system of FIG. 2A, in which the 3D object is pressed towards a pressure-sensitive surface of the mask, in accordance with one embodiment of the invention.
Figure 2E:
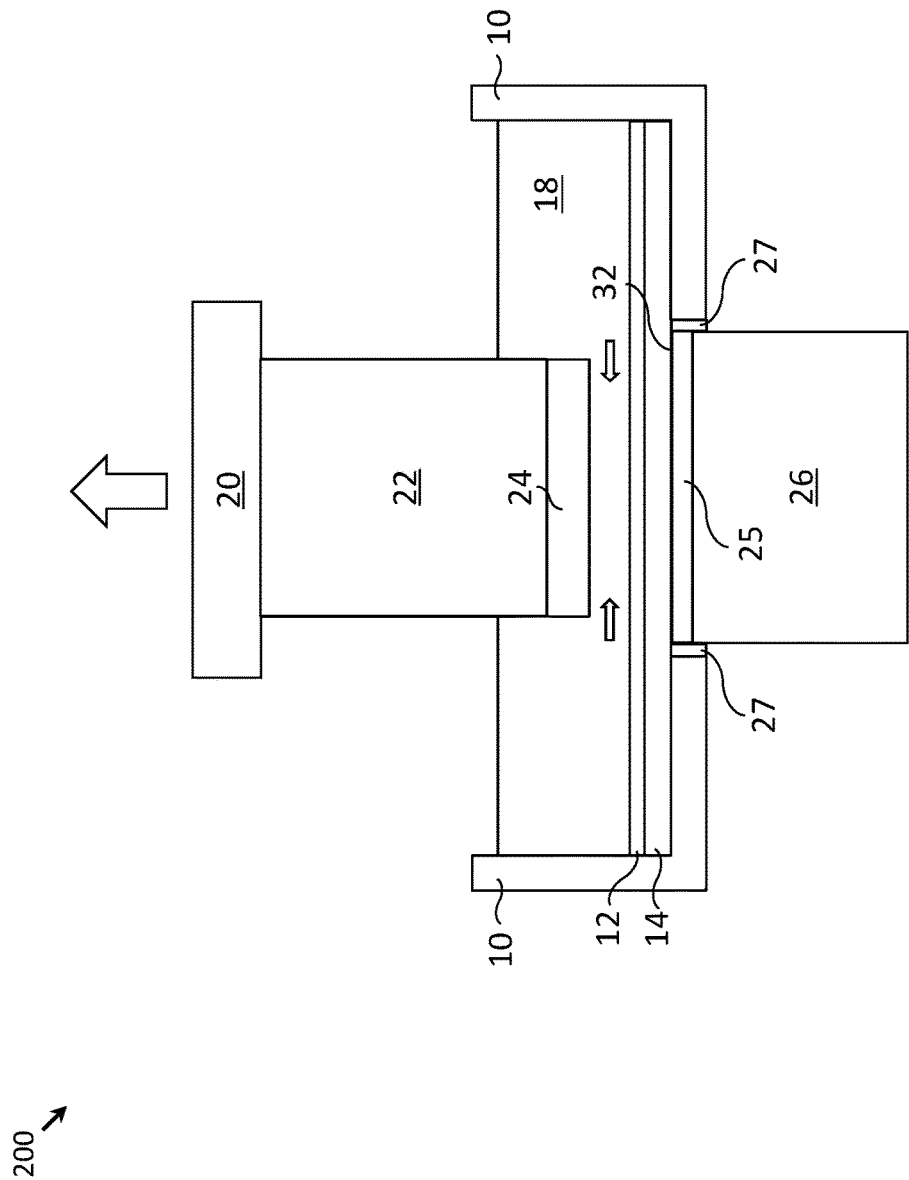
FIG. 2E depicts the 3D printing system of FIG. 2A, in which the 3D object is separated from the pressure-sensitive surface of the mask, in preparation for the formation of a subsequent layer of photo-cured liquid polymer, in accordance with one embodiment of the invention.

As depicted in FIG. 2B, electromagnetic radiation 28 is emitted from light source 26 and forms an image on image plane 30 so as to form the next layer of object 22. As depicted in FIG. 2C, photo-cured layer 24 has been formed adjacent to the bottom surface of object 22. As depicted in FIG. 2D, object 22 is gently pressed towards mask 25. Force from object 22 may be transferred through flexible membrane 14 onto pressure-sensitive surface 32 of mask 25. A pressure distribution of the bottom surface of object 22 pressing against mask 25 may be measured by pressure-sensitive surface 32 of mask 25. As depicted in FIG. 2E, object 22 may be positioned away from mask 25, in preparation for the formation of a subsequent layer of photo-cured liquid polymer. Similar to the embodiment of FIG. 1A, the inspection process described in association with FIGS. 2A-2E need not include flexible membrane 14. In such an embodiment, the newly formed layer 24 may be pressed directly against the pressure-sensitive surface of mask 25.

Figure 3A:
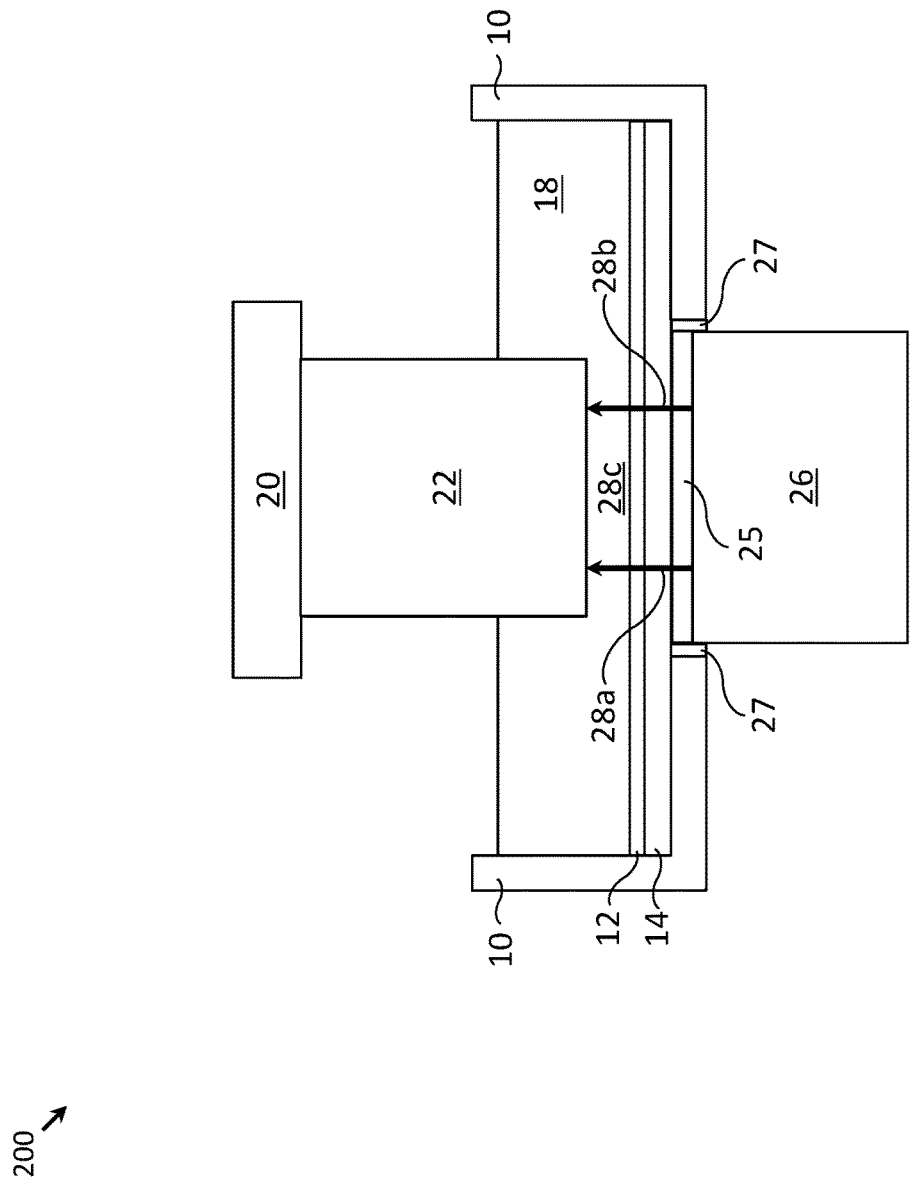
FIG. 3A depicts electromagnetic radiation being emitted from a light source into the tank containing photo-curing liquid polymer, in accordance with one embodiment of the invention.
Figure 3B:
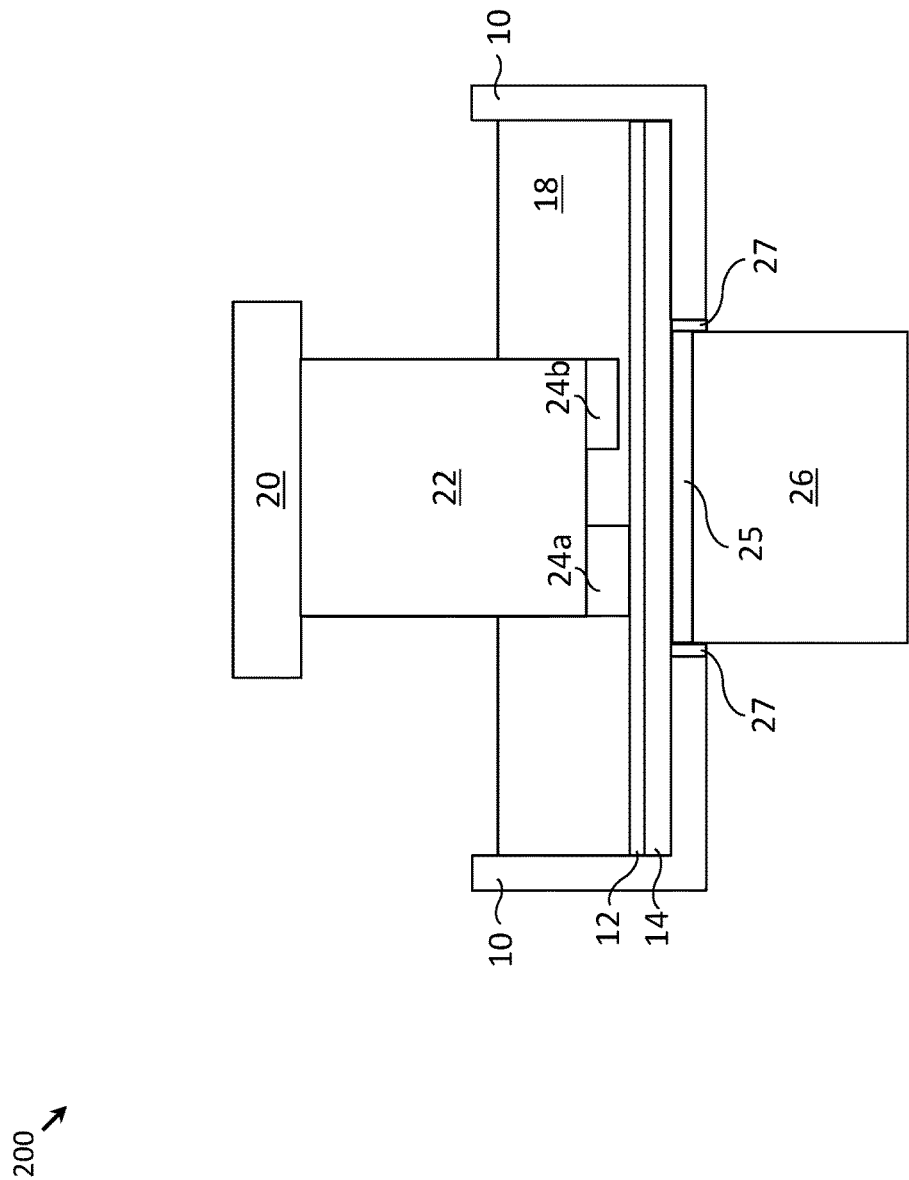
FIG. 3B depicts a layer of photo-cured liquid polymer exhibiting a flaw, in accordance with one embodiment of the invention.
Figure 3C:
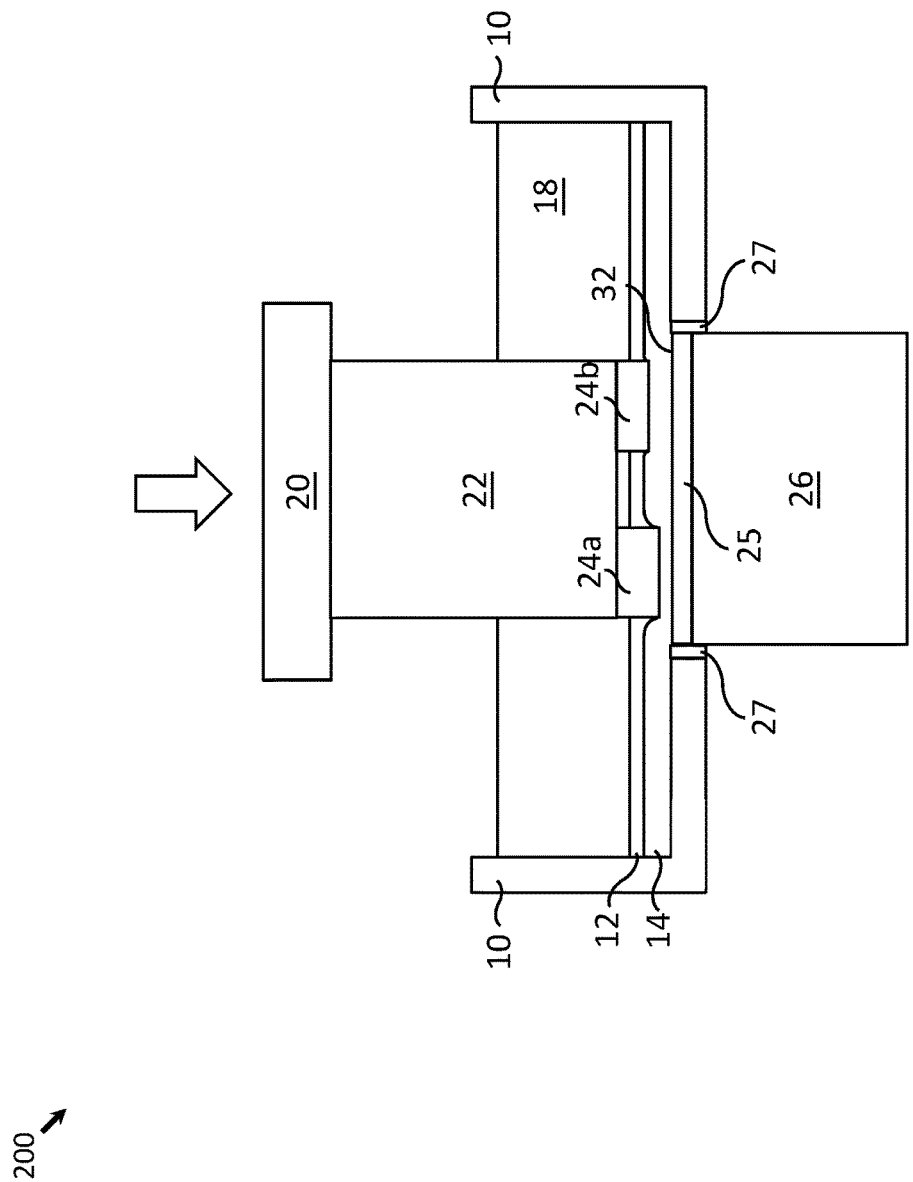
FIG. 3C depicts the flawed layer being pressed towards a pressure-sensitive surface of a mask, in accordance with one embodiment of the invention.

FIGS. 3A-3C provide a more detailed example of the inspection process. As shown in FIG. 3A, electromagnetic radiation is emitted with two regions of high intensity 28a, 28b and one region of zero intensity 28c. FIG. 3B shows the resulting cured layer, with cured portions 24a, 24b corresponding to regions with high radiation intensity, and a void in a central portion of the cured layer corresponding to the region without radiation. Following the above-described inspection procedure, object 22 is pressed towards pressure-sensitive surface 32 of mask 25 (FIG. 3C).

Figure 4B:
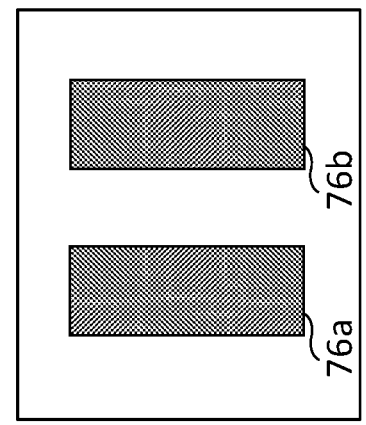
FIG. 4B depicts a pressure distribution that is expected for a layer of photo-cured liquid polymer that is properly formed at the particular point in the 3D printing process depicted in FIG. 3B (i.e., a reference pressure distribution), in accordance with one embodiment of the invention.
Figure 4A:
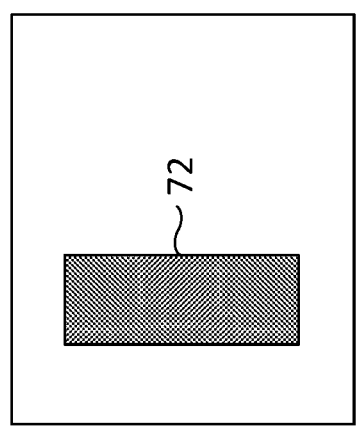
FIG. 4A depicts a pressure distribution that was present as the flawed layer was pressed towards the pressure-sensitive surface, as measured by the pressure-sensitive surface of the mask (i.e., a measured pressure distribution), in accordance with one embodiment of the invention.

FIG. 4A depicts pressure distribution 70 that was measured by pressure-sensitive surface 32, while FIG. 4B depicts reference pressure distribution 74. The measured pressure distribution 70 includes region 72 (i.e., darker shading indicating higher pressure readings) corresponding to cured portion 24*a*. In contrast, reference pressure distribution 74 includes regions 76*a* and 76*b*. A pointwise subtraction of the measured pressure distribution 70 from reference pressure distribution 74 may reveal the absence of region 76*b* in the measured pressure distribution 70, indicating a defect associated with either cured portion 24*b* (i.e., cured portion 24*b* having a height that is less than desired) or a defect associated with cured portion 24*a* (i.e., cured portion 24*b* having height that is greater than desired). Based on pressure distribution measurement 70, it may not be possible to determine whether the defect is associated with cured portion 24*a* or 24*b*, so further inspection (e.g., by a person) may be needed to pinpoint the location of the defect.

Figure 5:
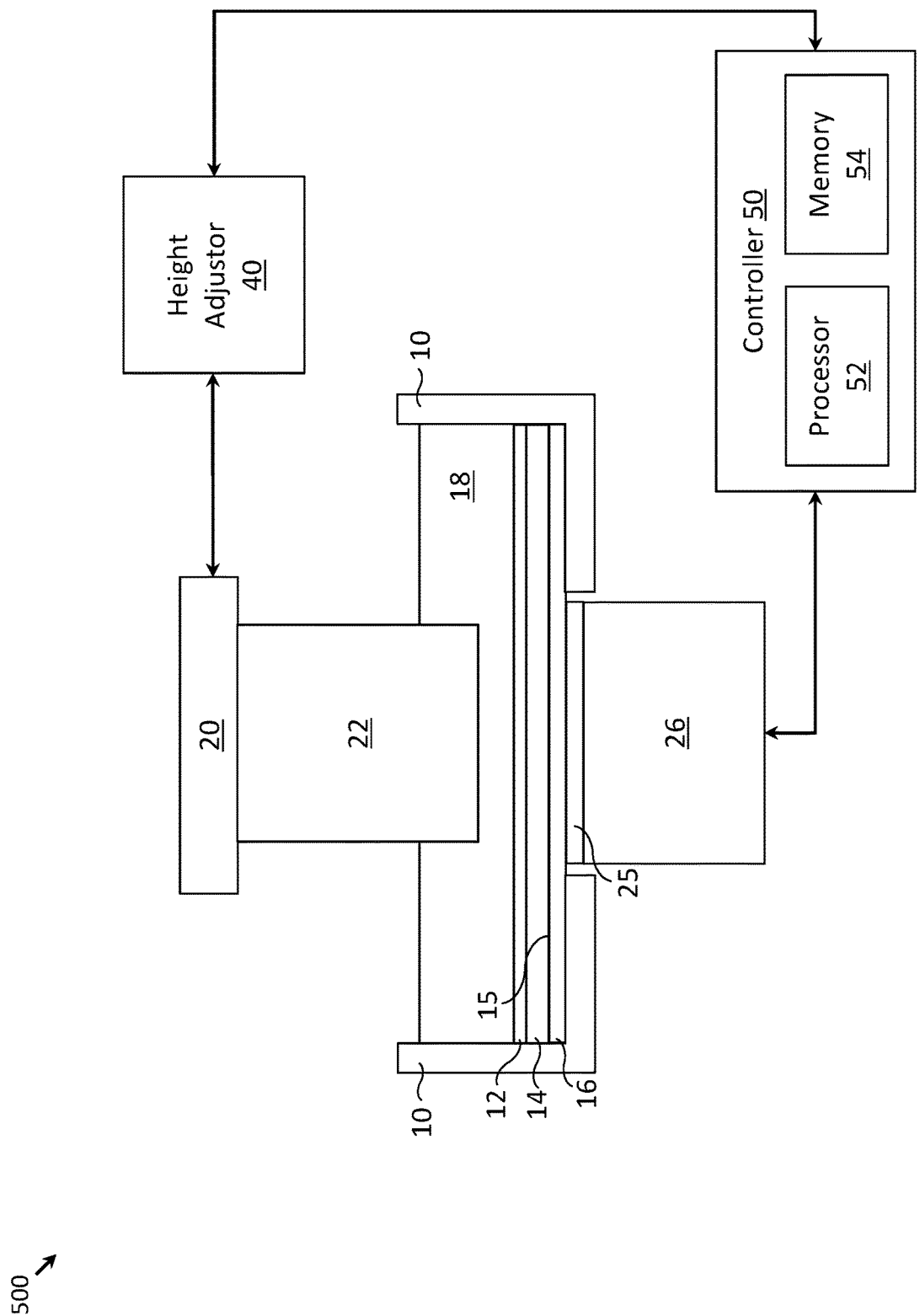
FIG. 5 depicts a controller communicatively coupled to one or more of a height adjustor, light source, mask and radiation-transparent backing member, in accordance with one embodiment of the invention.

FIG. 5 depicts height adjustor 40 and controller 50 of 3D printing system 500 with a backing member 16 having a pressure-sensitive surface 15. As explained above, height adjustor 40 may adjust a vertical position of extractor plate 20 (and more generally may adjust a vertical and horizontal position of extractor plate 20). Such adjustment may be performed as part of the inspection process (e.g., positioning object 22 adjacent to pressure-sensitive surface 15), and fabrication process (e.g., raising object 22 to replenish a layer of photo-curing liquid polymer 18 below the bottom surface of object 22). Height adjustor 40 may be controlled by controller 50, making the height adjustment process an automated process.

Controller 50 may also control light source 26 (e.g., controlling an intensity of light source 26), and mask 25 (e.g., controlling which regions of the mask pass light, which regions block light). Controller 50 may receive pressure distributions from the pressure-sensitive surface 15 of backing member 16. Controller 50 may include a processor 52 and memory 54, the memory 54 including instructions that, when executed by processor 52, cause the controller 50 to perform the above-described actions of the controller.

Figure 6:
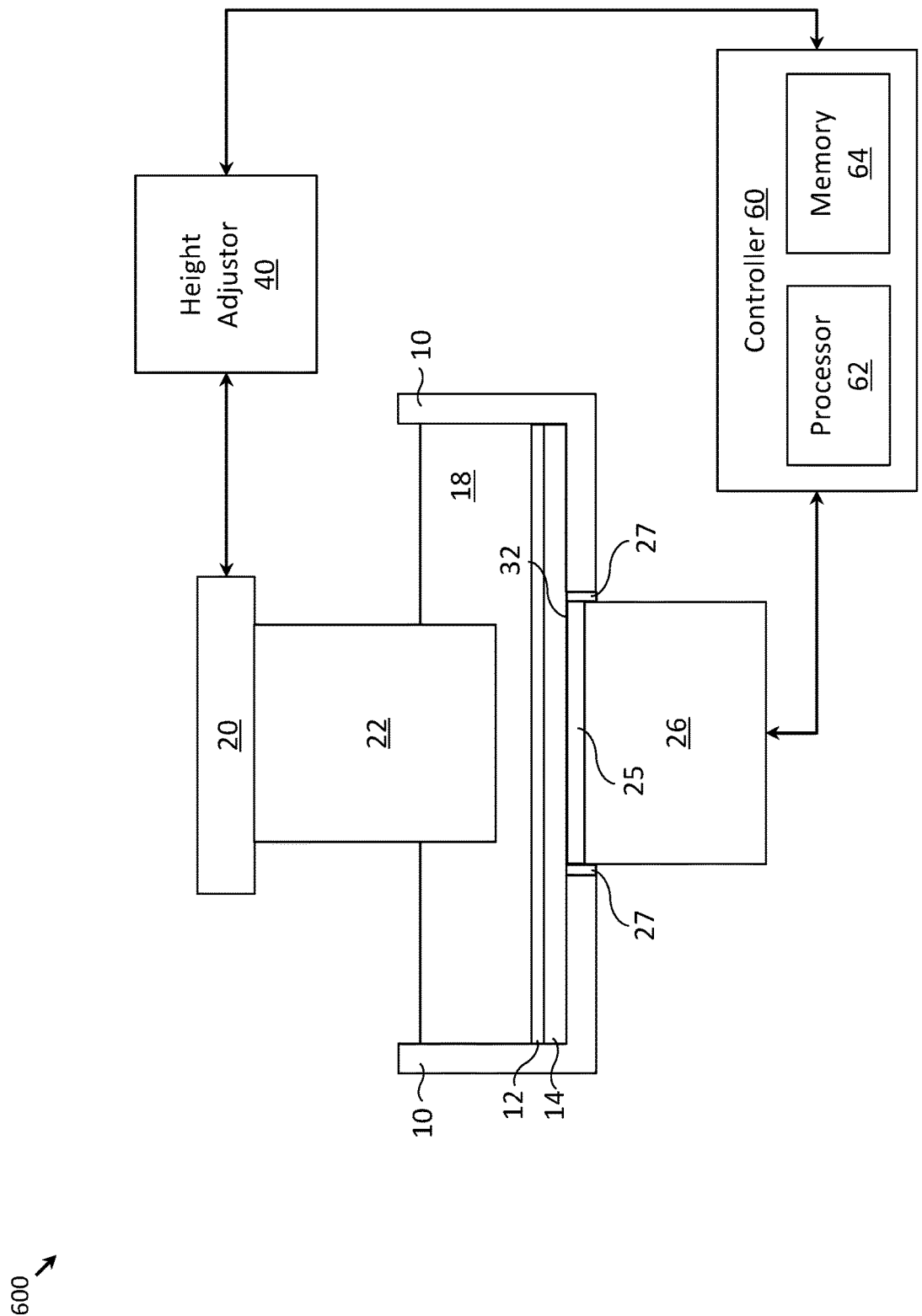
FIG. 6 depicts a controller communicatively coupled to one or more of a height adjustor, light source and mask, in accordance with one embodiment of the invention.

FIG. 6 depicts height adjustor 40 and controller 60 of 3D printing system 600 with mask 25 having a pressure-sensitive surface 32. As explained above, height adjustor 40 may adjust a vertical position of extractor plate 20 (and more generally may adjust a vertical and horizontal position of extractor plate 20). Such adjustment may be performed as part of the inspection process (e.g., positioning object 22 adjacent to pressure-sensitive surface 32), and fabrication process (e.g., raising object 22 to replenish a layer of photo-curing liquid polymer 18 below the bottom surface of object 22). Height adjustor 40 may be controlled by controller 60, making the height adjustment process an automated process.

Controller 60 may also control light source 26 (e.g., controlling an intensity of light source 26), and mask 25 (e.g., controlling which regions of the mask pass light, which regions block light). Controller 60 may receive pressure distributions from the pressure-sensitive surface 32 of mask 25. Controller 60 may include a processor 62 and memory 64, the memory 64 including instructions that, when executed by processor 62, cause controller 60 to perform the above-described actions of the controller.

Figure 7:
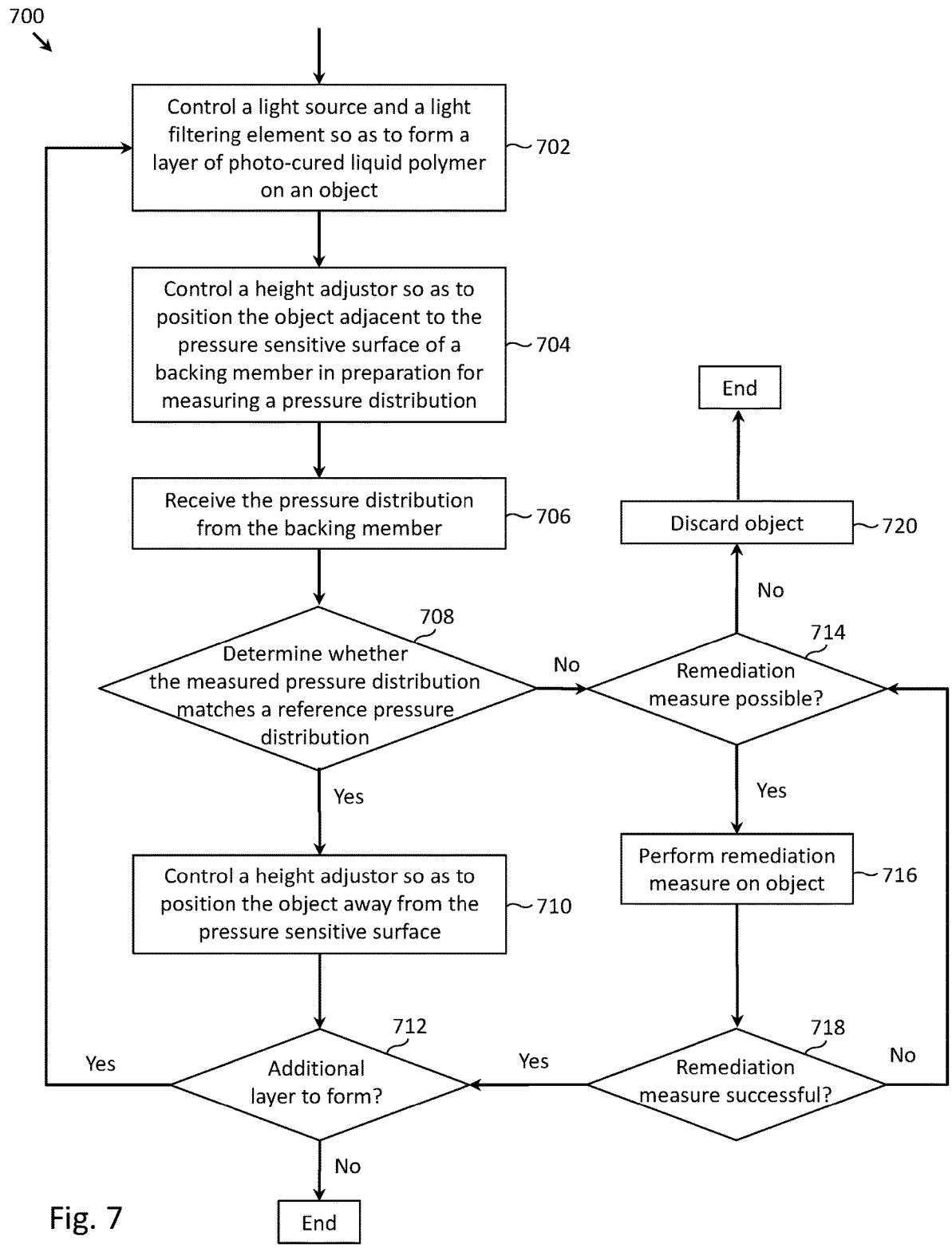
FIG. 7 depicts a flowchart of a process to form a 3D object using the 3D printing system of FIG. 1A, with one or more intermediate steps of inspecting a cured layer, in accordance with one embodiment of the invention.

FIG. 7 depicts flowchart 700 of a process to form a 3D object using the 3D printing system depicted in FIG. 1A, with one or more intermediate inspection steps of each newly formed layer of the 3D object. At step 702, controller 50 may control light source 26 and mask 25 so as to form a layer of photo-cured liquid polymer on object 22 (e.g., by emitting electromagnetic radiation from light source 26 and filtering the radiation to form an image on image plane 30 adjacent to the bottom surface of object 22). At step 704, controller 50 may control height adjustor 40 so as to position object 22 adjacent to pressure-sensitive surface 15 of radiation-transparent backing member 16 in preparation for measuring a pressure distribution. The pressure distribution may include a two-dimensional array of pressure measurements, each of the pressure measurements indicating a localized pressure generated by a force exerted from a localized region of object 22 on a localized region of the pressure-sensitive surface.

At step 706, controller 50 may receive the pressure distribution from radiation-transparent backing member 16. At step 708, controller 50 may determine whether the measured pressure distribution matches a reference pressure distribution (e.g., performing a pointwise subtraction). If the two pressure distributions match (yes branch of step 708), controller 50 may position object 22 away from the pressure-sensitive surface in preparation for the formation of a subsequent layer of photo-cured liquid polymer or for the removal of the completed object (step 710). At step 712, controller 50 may determine whether there is an additional layer to form. If so, the process repeats from step 702. Otherwise, the process ends.

If, however, the two pressure distributions do not match (no branch of step 708), controller 50 (or a person) may determine whether a remediation measure is possible (step 714). For instance, if not enough of the polymer was cured, additional polymer could be cured to correct for the deficiency. If, however, too much polymer was cured, then a remediation measure may not be possible, and the object may be discarded (step 720). If a remediation measure is possible, the remediation measure may be performed on the object (step 716). At step 718, controller 50 (or a person) may determine whether the remediation measure was successful. If the remediation measure is successful, the process proceeds to step 712 and controller 50 may determine whether there is an additional layer to form. If, however, the remediation measure is not successful, the process proceeds to step 714 and controller 50 (or a person) may determine whether another remediation measure is possible. If no additional remediation measure is possible, the object may be discarded (step 720) and the process ends.

Figure 8:
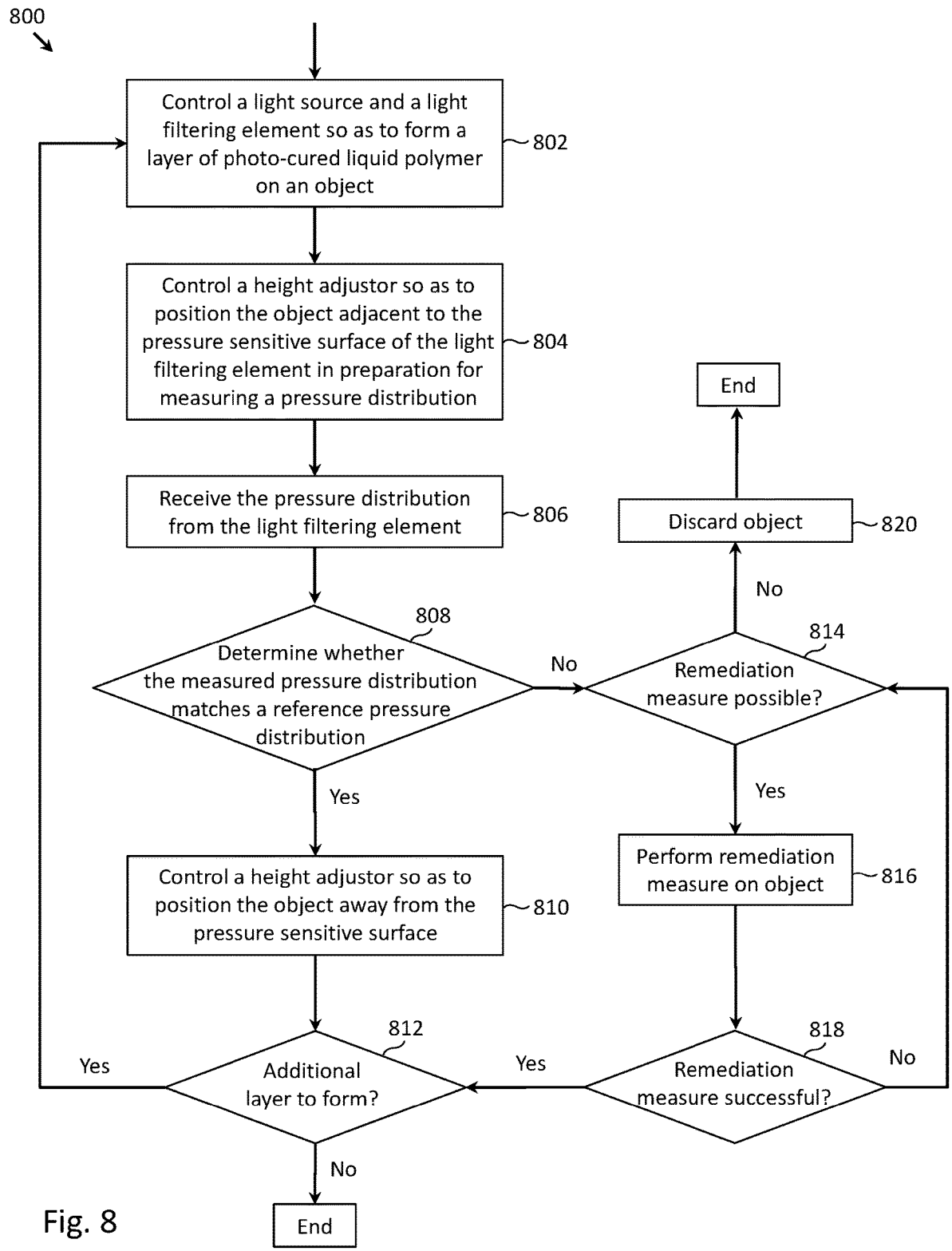
FIG. 8 depicts a flowchart of a process to form a 3D object using the 3D printing system of FIG. 2A, with one or more intermediate steps of inspecting a cured layer, in accordance with one embodiment of the invention.

FIG. 8 depicts flowchart 800 of a process to form a 3D object using the 3D printing system of FIG. 2A, with one or more intermediate inspection steps of each newly formed layer of the 3D object. At step 802, controller 60 may control light source 26 and mask 25 so as to form a layer of photo-cured liquid polymer on object 22. At step 804, controller 60 may control height adjustor 40 so as to position object 22 adjacent to pressure-sensitive surface 32 of mask 25 in preparation for measuring a pressure distribution. The pressure distribution may include a two-dimensional array of pressure measurements, each of the pressure measurements indicating a localized pressure generated by a force exerted from a localized region of object 22 on a localized region of the pressure-sensitive surface.

At step 806, controller 60 may receive the pressure distribution from mask 25. At step 808, controller 60 may determine whether the measured pressure distribution matches a reference pressure distribution (e.g., performing a pointwise subtraction). If the two pressure distributions match (yes branch of step 808), controller 60 may position object 22 away from the pressure-sensitive surface in preparation for the formation of a subsequent layer of photo-cured liquid polymer or for the removal of the completed object (step 810). At step 812, controller 60 may determine whether there is an additional layer to form. If so, the process repeats from step 802. Otherwise, the process ends.

If, however, the two pressure distributions do not match (no branch of step 808), controller 60 (or a person) may determine whether a remediation measure is possible (step 814). For instance, if not enough of the polymer was cured, additional polymer could be cured to correct for the deficiency. If, however, too much polymer was cured, then a remediation measure may not be possible, and the object may be discarded (step 820). If a remediation measure is possible, the remediation measure may be performed on the object (step 816). At step 818, controller 60 (or a person) could determine whether the remediation measure was successful. If the remediation measure is successful, the process proceeds to step 812 and controller 60 may determine whether there is an additional layer to form. If, however, the remediation measure is not successful, the process proceeds to step 814 and controller 60 (or a person) may determine whether another remediation measure is possible. If no additional remediation measure is possible, the object may be discarded (step 820) and the process ends.

Figure 9:
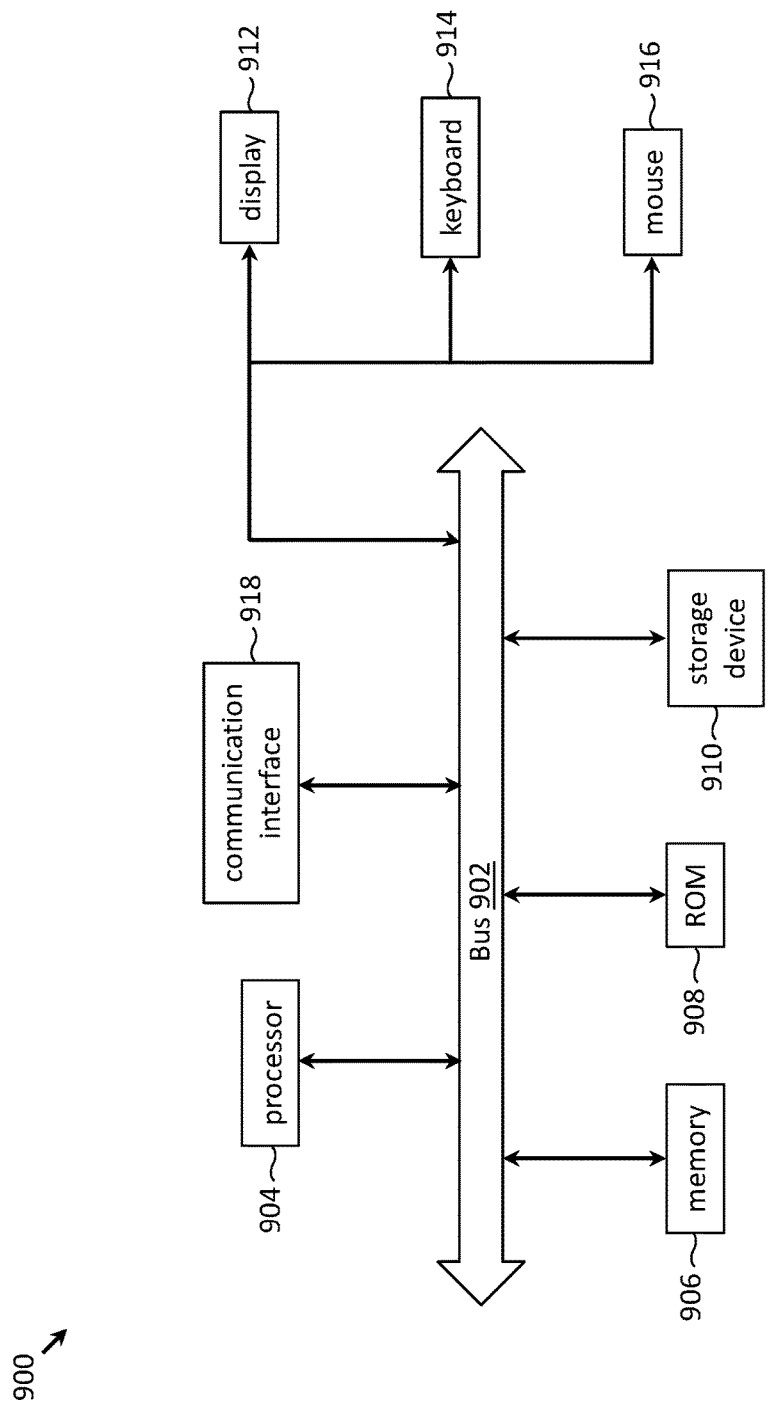
FIG. 9 depicts components of a computer system in which computer readable instructions instantiating the methods of the present invention may be stored and executed.

FIG. 9 depicts components of a computer system in which computer readable instructions instantiating the methods of the present invention may be stored and executed. As is apparent from the foregoing discussion, aspects of the present invention involve the use of various computer systems and computer readable storage media having computer-readable instructions stored thereon. FIG. 9 provides an example of a system 900 that may be representative of any of the computing systems (e.g., controller 50, controller 60, etc.) discussed herein. Note, not all of the various computer systems have all of the features of system 900. For example, certain ones of the computer systems discussed above may not include a display inasmuch as the display function may be provided by a client computer communicatively coupled to the computer system or a display function may be unnecessary. Such details are not critical to the present invention.

System 900 includes a bus 902 or other communication mechanism for communicating information, and a processor 904 coupled with the bus 902 for processing information. Computer system 900 also includes a main memory 906, such as a random access memory (RAM) or other dynamic storage device, coupled to the bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to the bus 902 for storing static information and instructions for the processor 904. A storage device 910, for example a hard disk, flash memory-based storage medium, or other storage medium from which processor 904 can read, is provided and coupled to the bus 902 for storing information and instructions (e.g., operating systems, applications programs and the like).

Computer system 900 may be coupled via the bus 902 to a display 912, such as a flat panel display, for displaying information to a computer user. An input device 914, such as a keyboard including alphanumeric and other keys, may be coupled to the bus 902 for communicating information and command selections to the processor 904. Another type of user input device is cursor control device 916, such as a mouse, a trackpad, or similar input device for communicating direction information and command selections to processor 904 and for controlling cursor movement on the display 912. Other user interface devices, such as microphones, speakers, etc. are not shown in detail but may be involved with the receipt of user input and/or presentation of output.

The processes referred to herein may be implemented by processor 904 executing appropriate sequences of computer-readable instructions contained in main memory 906. Such instructions may be read into main memory 906 from another computer-readable medium, such as storage device 910, and execution of the sequences of instructions contained in the main memory 906 causes the processor 904 to perform the associated actions. In alternative embodiments, hard-wired circuitry or firmware-controlled processing units may be used in place of or in combination with processor 904 and its associated computer software instructions to implement the invention. The computer-readable instructions may be rendered in any computer language.

In general, all of the above process descriptions are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 900 or similar electronic computing device, that manipulates and transforms data represented as physical (electronic) quantities within its registers and memories into other data similarly represented as physical quantities within its memories or registers or other such information storage, transmission or display devices.

Computer system 900 also includes a communication interface 918 coupled to the bus 902. Communication interface 918 may provide a two-way data communication channel with a computer network, which provides connectivity to and among the various computer systems discussed above. For example, communication interface 918 may be a local area network (LAN) card to provide a data communication connection to a compatible LAN, which itself is communicatively coupled to the Internet through one or more Internet service provider networks. The precise details of such communication paths are not critical to the present invention. What is important is that computer system 900 can send and receive messages and data through the communication interface 918 and in that way communicate with hosts accessible via the Internet.

Thus, methods and systems for measuring a pressure distribution between a surface of an object and a pressure-sensitive surface during formation of the object have been described. It is to be understood that the above-description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. An apparatus, comprising:
    a tank configured to contain a photo-curing liquid polymer, the tank including a tank opening;
    a mask disposed within the tank opening, the mask including pressure sensitive elements;
    a height adjustor configured to control a position of an object; and
    a controller configured to:

control the height adjustor so as to position a bottom surface of the object to be adjacent to a top surface of the mask facing into the tank;

control the mask to filter light from a light source to form an image on an image plane adjacent to the bottom surface of the object; and receive, from the mask, a pressure distribution of pressure measurements, each of the pressure measurements indicating a localized pressure generated by a compressive force exerted from a localized region of the object on a localized region of the mask.

2. The apparatus of claim 1, wherein the pressure distribution comprises a two-dimensional array of pressure measurements.

3. The apparatus of claim 1, further comprising a seal disposed between the tank opening and the mask, the seal preventing the photo-curing liquid polymer from leaking out of the tank through the tank opening.

4. The apparatus of claim 1, further comprising:

the light source configured to emit light, wherein the light emitted by the light source is filtered by the mask prior to entering into the tank.

5. A method, comprising:

controlling a light source and a mask so as to filter light from the light source using the mask and form a layer of photo-cured liquid polymer on an object, the object located within a tank containing a photo-curing liquid polymer, the tank including a tank opening, the tank opening surrounding the mask, and the mask including pressure sensitive elements;

controlling a height adjustor so as to position a bottom surface of the object to be adjacent to a top surface of the mask facing into the tank in preparation for measuring a pressure distribution of pressure measurements, each of the pressure measurements indicating a localized pressure generated by a compressive force exerted from a localized region of the object on a localized region of the mask;

receiving the pressure distribution from the mask; and controlling the height adjustor so as to position the bottom surface of the object to be away from the top surface of the mask in preparation for a subsequent layer of photo-cured liquid polymer to be formed on the object.

6. The method of claim 5, wherein the layer of photo-cured liquid polymer is formed by curing a portion of the photo-curing liquid polymer using light emitted by the light source, the light source disposed adjacent to the mask.

7. The method of claim 5, wherein the pressure distribution comprises a two-dimensional array of pressure measurements.

* * * * *